> United States Patent Office 3,476,807
Patented Nov. 4, 1969

3,476,807
ALUMINUM ALKOXIDE PROCESS FOR
PREPARING TERTIARY AMINES
James D. Johnston and Leslie L. Sims, Baton Rouge, La.,
assignors to Ethyl Corporation, New York, N.Y., a
corporation of Virginia
No Drawing. Filed Dec. 1, 1965, Ser. No. 510,976
Int. Cl. C07c 87/06, 31/02; C07f 5/06
U.S. Cl. 260—583                                    12 Claims

ABSTRACT OF THE DISCLOSURE

Aluminum alkoxides react with secondary amines to form tertiary amines. A typical product is lauryl dimethyl amine.

---

This invention relates to the production of materials having a tertiary amine structure and in particular to amines having two lower alkyl or aryl groups with about 1 to 20 carbon atoms each and one alkyl group with about 6 to 30 carbon atoms. A typical specific tertiary amine is dodecyl dimethyl amine, or "lauryl" dimethyl amine:

Materials such as the foregoing, particularly that specified, have considerable commercial significance typically in the detergent area, where, as the readily derived oxide, they are used as foam builders. Such usage is considerable in terms of quantity as well as in terms of monetary values since heretofore there has not been any really satisfactory method of low cost production of these materials. Several known routes involve olefins or alcohols and will be described more fully hereinafter however these suffer from basic disadvantages that cause excessive production costs.

The present invention seeks to reduce such costs by employing a newly discovered reaction using an essential raw material which is now becoming readily available at low cost.

In greater particularity the present invention has as an object the production of tertiary amines by reacting with secondary amine materials organo metallic compounds in which the organo radicals are linked with the metal through oxygen such as aluminum alkoxides, the reaction being conducted under conditions which will selectively produce high yield of desired product.

Another object of the present invention is to produce tertiary amines by a reaction in which alkyl radicals of aluminum alkoxides add to secondary amines such as dimethyl amine $HN(CH_3)_2$ with replacement of the hydrogen atom of the amine and without significant displacement of alkyl radicals already present on the amines.

Other and further objects of the present invention will become apparent upon careful consideration of the foregoing detailed discussion.

The reaction of alkoxides of aluminum with amines is not a totally new subject despite the fact that such a process is not used to produce tertiary amine compounds from secondary amine compounds. A possible reason for this is an early publication of Lazier and Adkins in J. Am. Chem. Soc. vol. 46, pp. 741–6 (1924) "The Alkylation of Primary Amines with Aluminum Alkoxides to Give Secondary Amines Free from Tertiary Amines." In this publication it is unequivocably stated (p. 742) that: "The evidence is conclusive that aluminum alkoxides do not form tertiary amines from primary or from secondary amines except in barely detectable amounts, if at all." This negative teaching has continued to more recent times as shown by U.S. Patent 3,080,424 in which aluminum alkoxides are used to produce primary and secondary amines from ammonia and primary amines and wherein there is no teaching as to the production of the valuable tertiary amines, further leading one to the conclusion that such are not produced from secondary amines, in effect agreeing with Lazier and Adkins on this point.

Thus it is understandable that present commercial processes for producing tertiary amines involve entirely different techniques such as the reaction of alcohols with secondary amines or the hydrobromination-amination treatment of olefins both of which suffer severe drawbacks, one in terms of poor selectivity of reaction resulting in the formation of comparatively large quantities of undesirable by-product (particularly diodecyl methyl amine); the other in terms of necessity for stringent halogen economies.

Surprisingly however it has now been discovered that aluminum alkoxides will react with secondary amines to produce tertiary amines in excellent yield virtually free of the formation of certain by-products of undesired nature characteristic of the alcohol reaction noted above. Specifically, dimethyl (secondary) amine can be reacted with an aluminum alkoxide such as tridodecoxy aluminum to produce dodecyl dimethyl amine with freedom from the production of large quantities of didodecyl methyl amine.

The reaction of secondary amines with aluminum alkoxides takes place readily under the proper conditions which involve principally the proper temperature and proportions of reactants, with time and pressure elements being dependent variables in the sense that the pressure is allowed to seek its own level and the duration of the reaction is determined by the extent of completion desired. Usually for the specific reactants mentioned above, pressures of the order of 1000–1500 p.s.i.g. will be experienced and reaction times of ¼ to 4 hours are employed.

The proper reaction conditions are important to secure the improved result of the present invention. The reaction does not proceed with the high selectivity that is possible unless the temperature of reaction is from about 300° C. to about 425° C., preferably 350° C. to 375° C. for optimum selectivity and rate of reaction, and even more specifically, about 350° C., and unless the proper proportions of reactants are employed. On a proportions basis the ratio of total replaceable hydrogen atoms of the amine reactant to the total alkoxide radicals of the aluminum alkoxide reactant is from about 5:1 to about 25:1. For a pure secondary amine the "total replaceable hydrogen atoms" is normally equal to the mols present whereas for the alkoxide the total is normally equal to three times the number of mols present. Preferably the reactant ratio is from about 5:1 to about 10:1 to achieve optimum selectivity and yield on a basis of reactor volume. An even more preferred ratio is about 5:1.

Thus, as defined above, tri-butoxy aluminum, as well as tri-dodecoxy aluminum, contains thre alkoxy radicals per molecule and dimethyl amine has one replaceable hydrogen per molecule so that a typical mol ratio of 44:1 (amine to alkoxide) actually represents a ratio of 14.7:1 on a total alkoxide radical and total replaceable hydrogen basis. Normally the alkoxide moiety is always on a 3/mol basis however in those instances where the compound or mass includes radicals which are not exclusively alkoxy, appropriate recognition of this in calculating ratios is necessary. Also where the alkoxy radicals of a compound or mass are not the same, such as a mixture of $C_{12}$, $C_{14}$ and $C_{16}$ straight chain radicals in about a 65:25:10 weight ratio approximating the distribution of carbon atoms of alcohols derived from naturally occurring coconut oil, an approximately similar ratio of substitution of radicals on the amine compound occurs, the proportion of higher radicals being increased in the amine product because of the preferential production of lower by-product alcohol as will be explained hereinafter.

Under the conditions described the reaction is selective to substitution of replaceable hydrogen atoms of the secondary amine compound to the extent that alkoxide radicals are available and avoids displacement of alkyl groups already present on the nitrogen compound by alkyl groups derived from the alkoxy compound. The amine reactant need not be pure if product purity is not essential. Thus primary amines or even ammonia can be present and will react to some extent however in those instances where two hydrogen atoms per molecule are replaced, the replacement is almost exclusively by alkyl radicals of the alkoxide.

Specifically for the production of dodecyl dimethyl amine, the reaction is preferably conducted with tri- dodecoxy aluminum and dimethyl (secondary) amine whereby the single replaceable hydrogen of the amine is replaced by a dodecyl group to provide the desired tertiary amine.

In this instance the principal by-products experienced are not undesired because they have considerable value and are related to the same product disposal channels as the builders or can be recycled. The by-products are principally alcohols produced by hydrolysis of alkoxide with water liberated in the reaction and which can be recovered, reinserted on aluminum and recycled to the present reaction. Thus in the case of dimethyl amine and tri-dodecoxy aluminum, the main by-product is dodecyl alcohol. Another by-product is trimethyl amine which is a saleable item. Small quantities of didodecyl methyl amine are readily separated by flash distillation.

A particularly desirable low cost aluminum alkoxide contains alkoxy radicals having a variety of carbon atoms per molecule, and which can be proportioned to correspond approximately to the "rounded-off" distribution of alcohols derived from naturally occurring coconut oil, namely by weight, about 65% $C_{12}$; 25% $C_{14}$, and 10% $C_{16}$, or as sometimes considered a closer approximation, about 2% $C_{10}$; 66% $C_{12}$; 23% $C_{14}$, and 9% $C_{16}$ (all by weight). Thus, it was desirable to experiment with such mixed alkoxides seeking to produce mixed tertiary amines having in addition to the two methyl groups, a proportioning of long radicals corresponding approximately to that of the coconut derived alcohol. Such is similar to "dodecyl-only" dimethyl tertiary amine (oxide) as to overall builder properties and is considerably lower in cost because of low cost raw material.

A suprising discovery was made at this point because the tertiary amine content of the product of the reaction using mixed alkoxides had a higher proportion of $C_{14}$ and $C_{16}$ components than did the starting alkoxide mixture and virtually all of the by-product alcohol produced in the reaction was limited to that corresponding to the lowest alkoxy radical in the reactants or the lowest plus the next lowest where the lowest was present in insufficient quantities to monopolize all of the alcohol by-product. In the case of the mixture containing about 65 percent $C_{12}$ as the lowest present this means that virtually the only alcohol by-product is dodecyl alcohol, a material also quite valuable as a detergent intermediate. Of course this is not a by-product in the sense that it cannot be converted effectively to amine because it can be readily reinserted on aluminum for recycle by displacement of the alkyl grouping of tri-isopropoxy aluminum or on tri-isobutyl aluminum or in other ways.

An outgrowth of this alcohol discovery is that the small concentration of about 2% $C_{10}$ components exemplified above, and of any lower impurities as well will go almost exclusively to alcohol by-product which is separable by distillation prior to displacement of the alcohols on tri-isopropoxy aluminum and hence need not be recirculated except as a deliberate recirculation where it is desired to increase the ratio of the intermediate radicals that are converted to amine per pass relative to the amount converted to alcohol. In some instance this is desirable to reduce processing costs.

One significant advantage of the present process is that it can be performed without the necessity for solvents or diluents and the usual problems attendant to such, particularly recovery, reactant capacity reduction of a given vessel, and the like.

Although the invention is particularly directed to the preparation of tertiary amines in which the alkyl radicals are of straight chain structure and monofunctional in the sense that each organic radical involved in the products is attached to only one nitrogen atom, the same general principles apply to other organic configurations which are readily produced by appropriate reactants. Already discussed are mixed alkoxide radicals of similar configuration differing in carbon atoms in the radicals added, typically those having from 6 to 30 carbon atoms per radical. Other sizes of alkoxy radicals can be used such as aluminum butoxide and alkoxides corresponding to eicosanol, pentacosanol, triacontanol as well as compounds corresponding to difunctional or polyfunctional organic radicals and to branched chain radicals, as well as cyclic, aromatic and various combinations of such materials. The difunctional radicals can illustrate the variety mentioned above, such being exemplified as glycol-based structures wherein each radical has two bonds to nitrogen, the nitrogen involved for particular radicals being the same or different atoms. Examples of aromatics include phenyl, benzyl, or the like. The obvious limitations of stability of reactants and products under the conditions involved provide items worthy of consideration.

As to the starting amine, considerable variation is possible however one unique feature of the present invention is almost complete freedom from replacement of alkyl radicals of the starting amine by alkyl radicals of the alkoxide. One normally selects a starting secondary amine which contains two radicals desired in the product and adds a third (usually dissimilar but not necessarily so) radical by the present reaction forming the desired tertiary amine. Thus the alkyl grouping of the starting amine is preferably dimethyl where dodecyl dimethyl amine product is desired however the starting amine can be of other structure similar to those of the categories of the alkoxy radical noted above such as diethyl, dipropyl, diisopropyl, dibutyl, didecyl or of cyclic, or aromatic nature such as diphenyl, dibenzyl, or combinations such as methyl-ethyl, ethyl-propyl, methyl-decyl, N-methyl aniline, N-ethyl aniline, N-butyl aniline, and the like.

Example 1

2.5 grams (0.010 mol) of aluminum butoxide and 20 grams (0.44 mol) of dimethylamine were heated in a 250 ml. Magnedash autoclave for 4 hours maintaining a relatively constant pressure throughout the run which was held to 430 to 460 p.s.i.g. The reactant mol ratio of amine to alkoxide was 44:1, or 14.7:1 on a hydrogen and moiety basis.

The decanted liquid product weighed 3.3 grams. Theory for n-butyldimethylamine is 3.0 grams. Analysis by vapor phase chromatography resolved the product into two components. The major component was proved to be n-butyldimethylamine by adding a small amount of authentic n-butyldimethylamine to a portion of the product and injecting this mixture into the VPC unit. The larger of the two peaks grew. The same technique was used to identify the smaller peak as n-butyl alcohol.

Example 2

15 grams (0.061 mol) of aluminum butoxide and 20 grams (0.44 mol) of dimethylamine were heated at 390° C.–395° C. for 3 hours in a 250 ml. Magnedash autoclave. The pressure (autogenous) ranged from 710 to 1025 p.s.i.g. The reactant mol ratio of amine to alkoxide was 7.2:1 or 2.4:1 on a hydrogen and moiety basis.

The liquid product (15.0 grams; theory was 18.5 grams) was fractionated at atmospheric pressure with an efficient column. Three fractions were collected over a temperature range of 117° C.–165° C.

Each of the three fractions and the residues were examined on VPC. A broad mixture of components was shown to be present. Only small amounts of n-butyldimethylamine and n-butyl alcohol were present, however.

The multiplicity of products was caused by the lower ratio of starting dimethylamine to aluminum butoxide showing the desirability of high ratio operation.

Example 3

5.0 grams (0.020 mol) of aluminum butoxide and 20 grams (0.44 mol) of dimethylamine were charged into a 100 ml. Magnedash autoclave. The reactant mol ratio was 22:1 or 7.1:1 on a hydrogen and moiety basis. The mixture was agitated and heated to 350° C. for two hours. The pressure (autogenous) was about 1250 to 1260 p.s.i.g.

The product was fractionated twice to obtain a purified sample of one major product. This sample was further purified by a preparatory VPC isolating the component present in largest amount. The infrared spectrum of this component was identical with the spectrum of authentic n-butyldimethylamine. The VPC retention times of product and authentic n-butyldimethylamine were identical. This VPC was performed with a Carbowax 20 M column.

Example 4

24 grams (0.04 mol) of aluminum dodecoxide and 40 grams (0.89 mol) of dimethylamine were charged into a 250 ml. Magnedash autoclave. The reactant mol ratio was 22.2:1 or 7.4:1 on a hydrogen and moiety basis. The reactants were brought up to temperature over a period of one hour and then held at 300° C.–310° C. for a period of 2 hours with vigorous agitation.

The pressure reached a maximum of 1400 p.s.i.g. and dropped to 1225 p.s.i.g. as the reaction progressed. The product was filtered yielding a liquid portion weighing 22.7 grams. The solids weighed 3.5 grams. Vapor phase chromatography showed the liquid to be about 80% dodecyldimethylamine and 20% dodecanol.

Example 5

24 grams (0.041 mol) of aluminum dodecoxide and 40 grams (0.89 mol) of dimethylamine were charged into a 250 ml. Magnedash autoclave. The reactant mol ratio was 21.7:1 or 7.25:1 on a hydrogen and moiety basis. The reactants were stirred and heated to 305° C. during 50 minutes. A reaction temperature of 305° C.–310° C. then was maintained for 1½ hours. At the end of the reaction time the heat input was discontinued and the autoclave was cooled to room temperature by an air stream.

The vent gases evolved during the run were liquefied and collected with a Dry Ice cooled trap. The weight of vent gas collected was 29 grams (theory 35 grams). The products were isolated by ether extraction. The ether was distilled from the extract. The product (distillation residue) contained 11.9 grams of dodecyldimethylamine (45% conversion) and 8.3 grams 1-dodecanol (36% conversion).

The off-gases contained 2.3% hydrogen, 94.8% dimethylamine, and 2.9% trimethylamine (all mol percent). Note that the starting dimethylamine analyzed 98.5% dimethylamine, 0.5% trimethylamine and 1.1% hydrogen (all mol percent).

Example 6

24 grams (0.041 mol) of aluminum dodecoxide was charged into a 250 ml. Magnedash autoclave followed by 39.7 grams (0.88 mol) of dimethylamine. The reactant mol ratio was 21.7 or 7.25 on a hydrogen and moiety basis. The autoclave was agitated and heated for two hours at 298° C.–305° C. preceded by a heat up time of twenty minutes. Pressure built up to 1350 p.s.i.g. and dropped to 990 p.s.i.g. during the course of warm-up and reaction. 33 grams of vent gas was collected, theory being 34 grams.

The product was extracted with ether to remove N,N-dodecyldimethylamine product and 1-dodecanol by-product. The ether was then removed by distillation. The residue from this ether distillation was analyzed by temperature programmed VPC. The residue left from the ether extraction was hydrolyzed and also analyzed by the same VPC technique. These analyses showed the reaction product was composed as follows:

dodecyldimethylamine, 10.5 grams or 40% conversion of the starting dodecoxide radicals to product 1-dodecanol, 7.5 grams or 31% conversion of the starting dodecoxide radicals to by-product alcohol unreacted aluminum dodecoxide 7 grams or 29% of starting dodecoxide radicals.

This is a 100% recovery of starting dodecoxide radicals.

The presence of unreacted aluminum dodecoxide is due to the lower temperatures used in this run.

Example 7

10 grams (0.017 mol) of aluminum dodecoxide and 22.2 grams (0.49 mol) of dimethylamine were charged into a 100 ml. Magnedash autoclave. The reactant mol ratio was 28.8:1 or 9.6:1 on a hydrogen and moiety basis. The autoclave was heated to 350° C. over a 20 minute period and held at 343° C. to 363° C. for ½ hour. The pressure rose to 1570 p.s.i.g. and then dropped to 1400 p.s.i.g. at the conclusion of the reaction period.

The contents of the autoclave were transferred to a glass distillation apparatus and flash distilled at atmospheric pressure. The flash distillate contained 6.4 grams of dodecyldimethylamine (60% of starting dodecoxide radicals) and 3.1 grams of 1-dodecanol (33% of starting dodecoxide radicals). Analysis (by hydrolysis and VPC analysis) of the distillation residue showed that 0.05 gram of the starting aluminum alkoxide was unreacted.

This experiment shows that 350° C. and ½ hour reaction time leads to good conversions to dodecyldimethylamine product (60%). The overall conversion to amine and 1-dodecanol was very good (93%) and very little unreacted aluminum dodecoxide remained. Also the conversion to didodecylmethylamine is very small.

Example 8

An aluminum alkoxide mixture containing dodecoxide, tetradecoxide and hexadecoxide radicals in a ratio of about 65:25:10 was used as "alkoxide" reactant in this run. This mixture was prepared by treating a 65:25:10 mixture of $C_{12}$, $C_{14}$ and $C_{16}$ primary alcohols with triisobutylaluminum. 28.3 grams (0.044 mols) of the mixed alkoxide reactant was charged into a 250 ml. Magnedash autoclave followed by 45.0 grams (1.0 mols) of dimethylamine. The average mol ratio was 22.8:1 or 7.6 on a hydrogen and moiety basis. The autoclave was held at 333° C.–368° C. for 25 minutes after a 20 minute warm-up; pressure rising to 1325 p.s.i.g. and dropping to 1100 p.s.i.g. at the conclusion of the reaction period.

The product was flash distilled at atmospheric pressure. The distillate was examined on temperature programmed VPC, Carbowax 20 M column. The product was shown to contain the expected amines, viz. dodecyldimethylamine, tetradecyldimethylamine, and hexadecyldimethylamine along with dodecanol as the principal alcohol present. There was negligible tetradecanol and hexadecanol present.

Example 9

30 grams of product dodecyldimethylamine, 15 grams of by-product 1-dodecanol, 100 ml. dry toluene and 9.0 grams of aluminum isopropoxide were charged to a round bottom glass flask. The reactants were stirred with a bar magnet and isopropanol alcohol and toluene slowly distilled out through a 20 cm. long Vigreux column. 32.7 grams of distillate was collected, analyzing to contain toluene and 4.9 grams of isoproapnol. Theoretical weight of isopropanol is 4.9 grams. The remaining toluene was distilled out, and then a vacuum was applied (pressure 2 mm. Hg) and the dodecyldimethylamine was flash distilled at 175° C. and recovered in near quantitative yields. No free 1-dodecanol was found in any of the distillates, indicating complete conversion to aluminum dodecoxide for recycle in a subsequent reaction with additional dimethylamine.

Analysis of the residue of the second flash distillation after hydrolysis, followed by VPC analysis showed that 87% of the 1-dodecanol was converted to aluminum dodecoxide and 9% to a dimeric compound.

Example 10

6.4 grams (0.035 mol) of 1-dodecanol, 3.3 grams (0.0057 mol) of aluminum dodecoxide and 20 grams (0.44 mol) of diemthyl amine were charged into a 100 ml. Magnedash autoclave. The mixture was agitated and heated at 340° C.–354° C. for a period of 40 minutes, heat-up time being 1 hour. The pressure was 1270 to 1375 p.s.i.g.

The reaction products were distilled and the distillate analyzed as follows:

|  | Grams |
|---|---|
| 1-dodecanol | 7.8 |
| Dodecyldimethyl amine | 2.1 |

The weight of amine product represents a 58% conversion of aluminum dodecoxide. This corresponds to the expected conversion and demonstrated that the alcohol does not react under these conditions.

The increase in 1-dodecanol was 1.4 grams. This represents a 39% conversion of aluminum dodecoxide which is the typical conversion to free alcohol when aluminum alkoxide is reacted with dimethyl amine.

What is claimed is:

1. A process for producing tertiary amines of the formula

wherein $R_1$ and $R_2$ are alkyl radicals having from 1 to about 20 carbon atoms each and $R_3$ is alkyl radical having from about 6 to about 30 carbon atoms comprising reacting a secondary amine having the structure

with an aluminum alkoxide $Al(OR_3)_3$ at a temperature from about 300° C. to about 425° C., the reactants being in the ratio of about 5:1 to about 25:1 on the basis of replaceable hydrogen atoms of the amine reactant to alkoxy radicals of the aluminum alkoxide.

2. The process of claim 1 wherein the temperature is from about 350° C. to about 375° C.

3. The process of claim 1 wherein the temperature is about 350° C.

4. The process of claim 1 wherein the reactant ratio is from about 5:1 to about 10:1.

5. The process of claim 1 wherein the reactant ratio is about 5:1.

6. The process of claim 1 wherein the temperature is about 350° C., the reactant ratio is about 5:1 and the secondary amine is dimethyl amine.

7. The process of claim 1 wherein the secondary amine has from about 2 to about 10 carbon atoms per alkyl radical.

8. The process of claim 1 wherein each of the alkyl radicals of the secondary amine has from about 2 to about 4 carbon atoms.

9. The process of claim 1 wherein the secondary amine is dimethyl amine.

10. The process of claim 1 wherein the aluminum alkoxide has from about 10 to about 16 carbon atoms per alkoxide radical.

11. The process of claim 1 wherein the secondary amine is dimethyl amine and the aluminum alkoxide has from about 10 to about 16 carbon atoms per alkoxide radical.

12. A process in accordance with claim 1 further characterized in that product tertiary amine containing by-product alcohol having the same number of carbon atoms per molecule as in individual alkoxide radicals of the starting aluminum alkoxide is treated for conversion of the by-product alcohol to aluminum alkoxide by reaction with additional aluminum alkoxide having fewer carbon atoms in each alkoxide radical than in the starting aluminum alkoxide thereby producing by an exchange reaction free alcohol having the same number of carbon atoms per molecule as in the individual alkoxy groups of the additional aluminum alkoxide, the by-product alcohol and the additional aluminum alkoxide being in about stoichiometric proportions, and distilling off the free alcohol produced in the foregoing step and the tertiary amine product, providing an aluminum alkoxide residue whose alkoxide groups have the same number of carbon atoms per group as in the by-product alcohol molecules.

References Cited

UNITED STATES PATENTS 3,080,424   3/1963   Gwynn et al. ____ 260—563 XR

OTHER REFERENCES

Lazier et al.; J.A.C.S., vol. 46, 1924, pp. 741–746.

CHARLES B. PARKER, Primary Examiner

PATRICIA C. IVES, Assistant Examiner

U.S. Cl. X.R.

252—89; 260—448, 576, 577, 632